(12) United States Patent
Giannelli

(10) Patent No.: US 6,205,909 B1
(45) Date of Patent: Mar. 27, 2001

(54) BREWING UNIT FOR AUTOMATIC BEVERAGE DISPENSERS COMPRISING IN PARTICULAR A BOILER

(75) Inventor: Giuseppe Giannelli, Olgiate (IT)

(73) Assignee: Moulinex S.A., Caen Cedex (FR)

( * ) Notice: Subject to any disclaimer, the term of this patent is extended or adjusted under 35 U.S.C. 154(b) by 0 days.

(21) Appl. No.: 09/486,985

(22) PCT Filed: Sep. 4, 1998

(86) PCT No.: PCT/FR98/01905

§ 371 Date: May 23, 2000

§ 102(e) Date: May 23, 2000

(87) PCT Pub. No.: WO99/12456

PCT Pub. Date: Mar. 18, 1999

(30) Foreign Application Priority Data

Sep. 5, 1997 (IT) ............................................. CO970015 U
Mar. 20, 1998 (IT) ............................................. CO980005 U

(51) Int. Cl.[7] ............................. A47J 31/40; A47J 31/54
(52) U.S. Cl. ......................... 99/302 P; 99/287; 99/289 R
(58) Field of Search .............................. 99/302 P, 302 R, 99/289 R, 287, 289 P, 300, 297

(56) References Cited

U.S. PATENT DOCUMENTS 3,413,909 12/1968 Heier .
4,852,472 * 8/1989 In-Albon et al. .............. 99/302 P X
5,471,910 * 12/1995 Sager ............................. 99/302 P X
5,479,849 1/1996 King et al. .............................. 99/287
6,116,147 * 9/2000 Schmed ............................... 99/302 P

FOREIGN PATENT DOCUMENTS 42 03 088 10/1992 (DE) .
0 270 141 6/1988 (EP) .
2 444 437 7/1980 (FR) .
2 447 173 8/1980 (FR) .

* cited by examiner

*Primary Examiner*—Reginald L. Alexander
(74) *Attorney, Agent, or Firm*—Young & Thompson

(57) ABSTRACT

The invention concerns a brewing unit comprising a body (10) with a longitudinal axis (V) containing an infusion chamber (31) capable of receiving a pressing plunger (62) mounted mobile along the axis (V) by a drive mechanism (59), pumping member (40) for circulating water and brew, and a boiler (60) for heating the water for the preparation of the brew in the chamber (31). The invention is characterized in that the boiler (60) and the body (10) are formed in one single piece made of a heat conducting material with heating electrical resistance (26), water heating and passage channels (30) whereof the inlets (33) are connected to a cold water reservoir (R) and the ends (33') emerge in the brewing chamber (31); and the pressing plunger (62) has a conduit (42) for the passage of the brew emerging through an outlet (42b), whereas the pumping member (40) is adapted to generate an ascending circulation of water in the brewing chamber (31) towards the conduit (42). The invention is applicable in particular to espresso coffee brewing machines.

13 Claims, 3 Drawing Sheets

BREWING UNIT FOR AUTOMATIC BEVERAGE DISPENSERS COMPRISING IN PARTICULAR A BOILER

The present invention relates generally to infusion units for automatic beverage dispensers from powdered coffee or the like, and relates more particularly to an infusion unit comprising a body with a longitudinal axis V enclosing an infusion chamber having a bottom and an outlet, comprising a filter plate and adapted to receive a pressure piston mounted movably along the axis (V) by means of a drive mechanism, pump means adapted to create a circulation of water and infusion, as well as a boiler adapted to heat the water for the preparation of the infusion in the chamber.

In an infusion unit of this type, the boiler is generally independent of the body enclosing the infusion chamber and this gives rise to a large heat loss in the circulation of water and infusion. Moreover, because of the separation of this boiler, the body enclosing the infusion chamber is reheated only during passage of the hot water into said chamber, thereby giving, during the first cycles of production of the infusion, too low a temperature to this infusion, which satisfies no users.

On the other hand, in this type of infusion unit, the pumping means create a circulation of hot water from the boiler, via the pressure piston, to the infusion chamber through which the produced infusion flows, as will be understood, this direction of circulation of water increases the heat loss and hence is undesirable for good production of an infusion.

The invention has particularly for its object to overcome these drawbacks and to provide a unit of simple and economical design.

According to the invention, the infusion unit is more particularly characterized in that the boiler and the body are formed from a single piece of heat conductive material which contains a heating electrical resistance, channels for the passage and heating of the water whose inlets are connected to a cold water reservoir and whose ends empty onto the bottom of the infusion chamber, and the pressure piston has a conduit for passage of the infusion opening through an outlet opening, whilst the pumping means are adapted to create a rising circulation of infusion in the infusion chamber toward the passage conduit when the pressure piston closes the chamber.

Thus, thanks to this design, there is provided a compact assembly: boiler-body-infusion chamber, producing great homogeneity of temperature and hence rapid and marked heating of the water through the channel which communicate with the infusion in the course of production in the infusion chamber. Moreover, this rise in circulation in the chamber toward the piston minimizes heat losses and leads to obtaining an excellent infusion, namely, good extraction of the essences of the coffee powder at about 92° to 96° C. and a temperature suitable for this coffee of about 72° C., 75° C.

According to a preferred embodiment of the invention, the channels extend mostly along axes parallel to the longitudinal axis V below the infusion chamber.

Thus, the problem of the buildup of scale generally connected with existing boilers is practically eliminated in the unit of the invention because the channels have no elbow in their hot portion. On the other hand, it will be understood that such channels can also be easily cleaned by a scraping tool to maintain them in their initially clean condition.

According to other characteristics of the invention, the body has in its side wall a groove for insertion of the resistance and comprises facing the resistance a secondary heater which has for this purpose a shaped housing adapted to mate with the sidewall by a peripheral profile by providing a flattened chamber having a cold water inlet and a steam outlet.

The secondary boiler connected to the body is particularly economical because it uses the body and the electrical resistance as common elements. The secondary boiler is particularly used for producing steam in the production of tea or cappuccino.

The characteristics and advantages of the invention will become apparent from the description which follows, given by way of non-limiting example, with reference to the accompanying drawings, in which.

Figure 1:
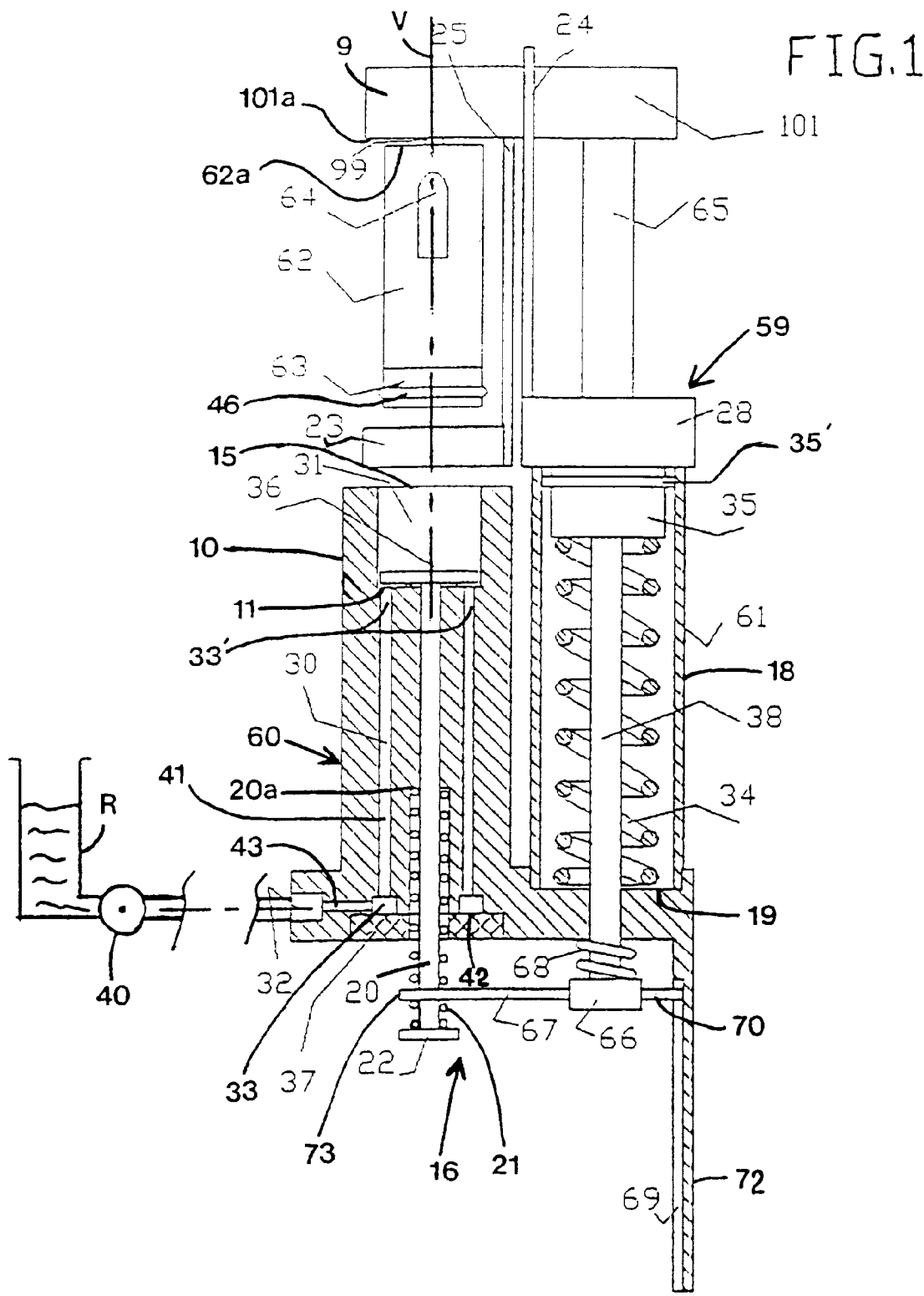
FIG. 1 is a fragmentary front vertical cross-section of an infusion unit according to the invention.

In the embodiment shown in FIG. 1, infusion unit is adapted to equip a coffeemaker of the automatic type comprising a cold water supply, a powdered coffee dispenser from either a store of powdered coffee or a coffee roaster integrated with the dispenser and an electronic control and management device for the cycles of preparation of the infusions.

Such an infusion unit comprises particularly a body 10 with a longitudinal axis V enclosing an infusion chamber 31 which has a bottom 11 and a mouth 15 as well as a filter plate 36 and which is adapted to receive a pressure piston 62 movably mounted along the axis V by means of a drive mechanism 59, pumping means schematically shown at 40, adapted to create a circulation of water and infusion, as well as a boiler 60 adapted to boil the water for the preparation of the infusion in the chamber 31. According to a particular characteristic of the invention, but not a limiting one, the body 10 is arranged laterally with a single acting hybrid hydraulic jack 61 whose piston head 35 comprises an upper rod 65 carrying an arm 101 forming a support and whose free end 9 is connected to the pressure piston 62, the paths of the pistons 61 and 62 being thus arranged in practically parallel directions. Moreover, the pressure piston 62 is mounted floatingly on a pivot 99 connected to the arm 101 and thus providing a slight axial play between the upper portion 62a of the pressure piston and the lower portion 101a of the arm.

According to the invention, the boiler 60 and the body 10 are formed of a single piece of heat conductive material which contains an electric heating resistance 26, the channels 30 for passage and heating of the water whose inlets 33 are connected, via the pump means, to a cold water reservoir (R) and whose ends 33' open through the bottom 11 of the infusion chamber 31, and the pressure piston 62 has a conduit 42 for the passage of the infusion opening through an outlet opening 42b, whilst the pumping means 40 are adapted to create an ascending flow of water in the infusion chamber 31 toward the conduit 42 when the pressure piston 62 closes the chamber 31. Preferably, the conductive material is aluminum, but materials such as copper, zinc or its alloys could be used.

It should be emphasized that this design in a single piece of heat conductive material, of the body 10 enclosing the chamber 31, and of the heater 60, permits obtaining a compact assembly of uniform temperature which is moreover present in the lateral construction of the piece forming the body and the heater with the hydraulic jack 61 to constitute an infusion unit of very small size and thus permitting obtaining a lower sales price than that of the known unit, and corresponding to cause a decrease in the price of the machine. Thus, as shown, a single body-boiler piece also forms the bottom of the jack which is very economical and strong.

Moreover, so as to decrease the sales price, the filter plate is movably mounted in the infusion chamber 31 by means of an ejection mechanism 16, said mechanism 16 comprising a rod 20 mounted slidably in the bore 20a provided in the body 10 along the axis (V) and passing through a cover 31.

According to a preferred embodiment of the invention, the channels extend mostly along axes parallel to the longitudinal axis (V) below the infusion chamber.

Thus, as shown in FIG. 1, the channels 30 are each comprised by a large rectilinear section 41 opening through the end 33' into the chamber 31 and by the inlet 33 in a well 42, and a small rectilinear section 43 opening into said well 42 and into the inlet 32, said well being closed by the cover 37 which is removably mounted. Thanks to such an embodiment, the body 10 and the boiler 61 form a single bloc that can be made of an extrudable material resistant to heat and to the mechanical stresses, such as spun aluminum.

Figure 2:
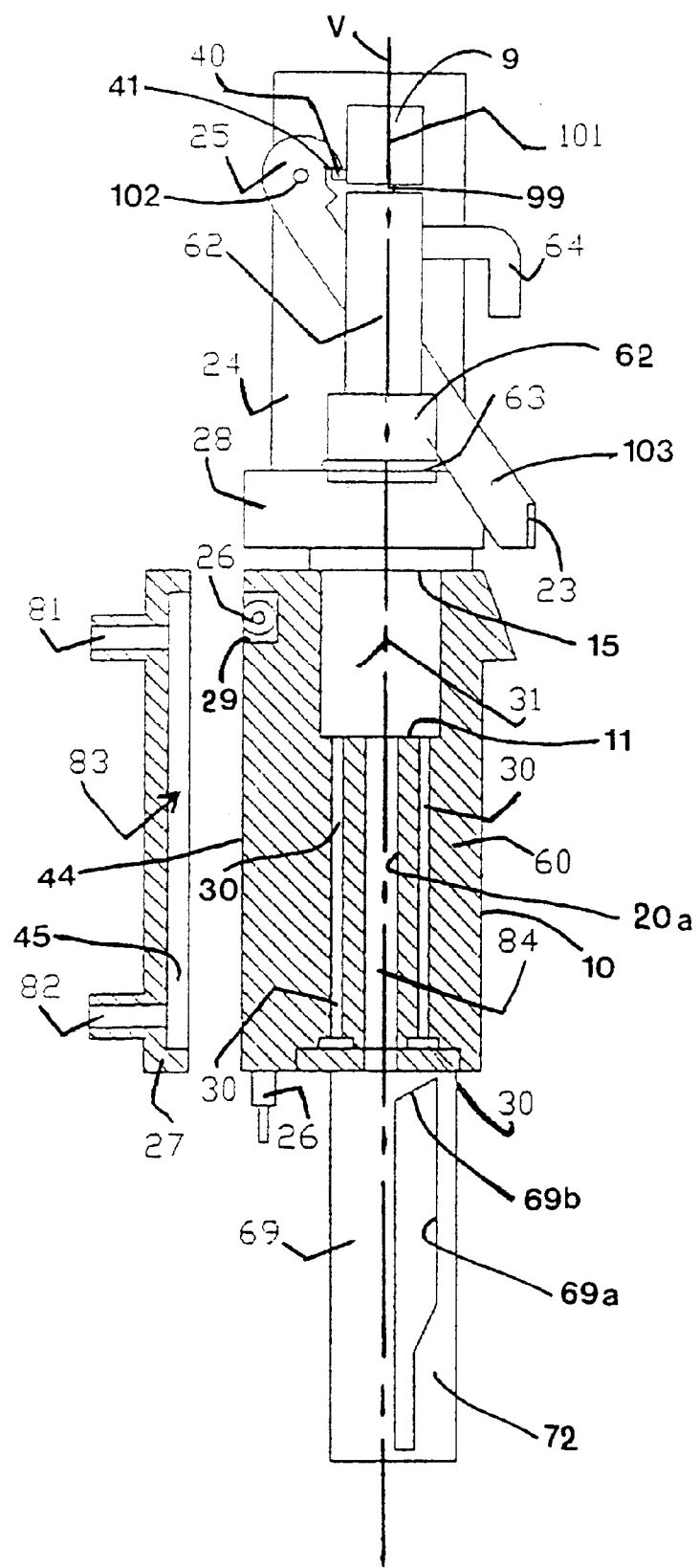
FIG. 2 is a left side view of the unit of FIG. 1 with expansion of a secondary boiler and removal of an injection mechanism.

Referring to FIG. 2, it will be seen that the body 10 has on its sidewall 44 a groove 29 for the insertion of the resistance 26. The electric heating resistance 26 thus extends laterally over all the height of the body 10. Moreover, the groove 29 has a U shape and the resistance 26 being of the shielded type has the shape of a U shaped pin or the like with the shape of the groove.

Thus, the body 10, the channels 30 and the infusion chamber 31 are heated over all their height, thereby rendering the temperature even, practically instantaneously. On the other hand, the rectilinear sections 41 of the channels do not promote the deposit of scale and can be easily cleaned by a tool introduced into the channels 30 after removal of the cover 37.

According to another characteristic of the invention which is particularly advantageous against toxicity of materials, and in the case in which the material of the body is aluminum, the internal walls of the chamber 31 and the channels 30 are lined with a material inert relative to water such as for example stainless steel.

Figure 3:
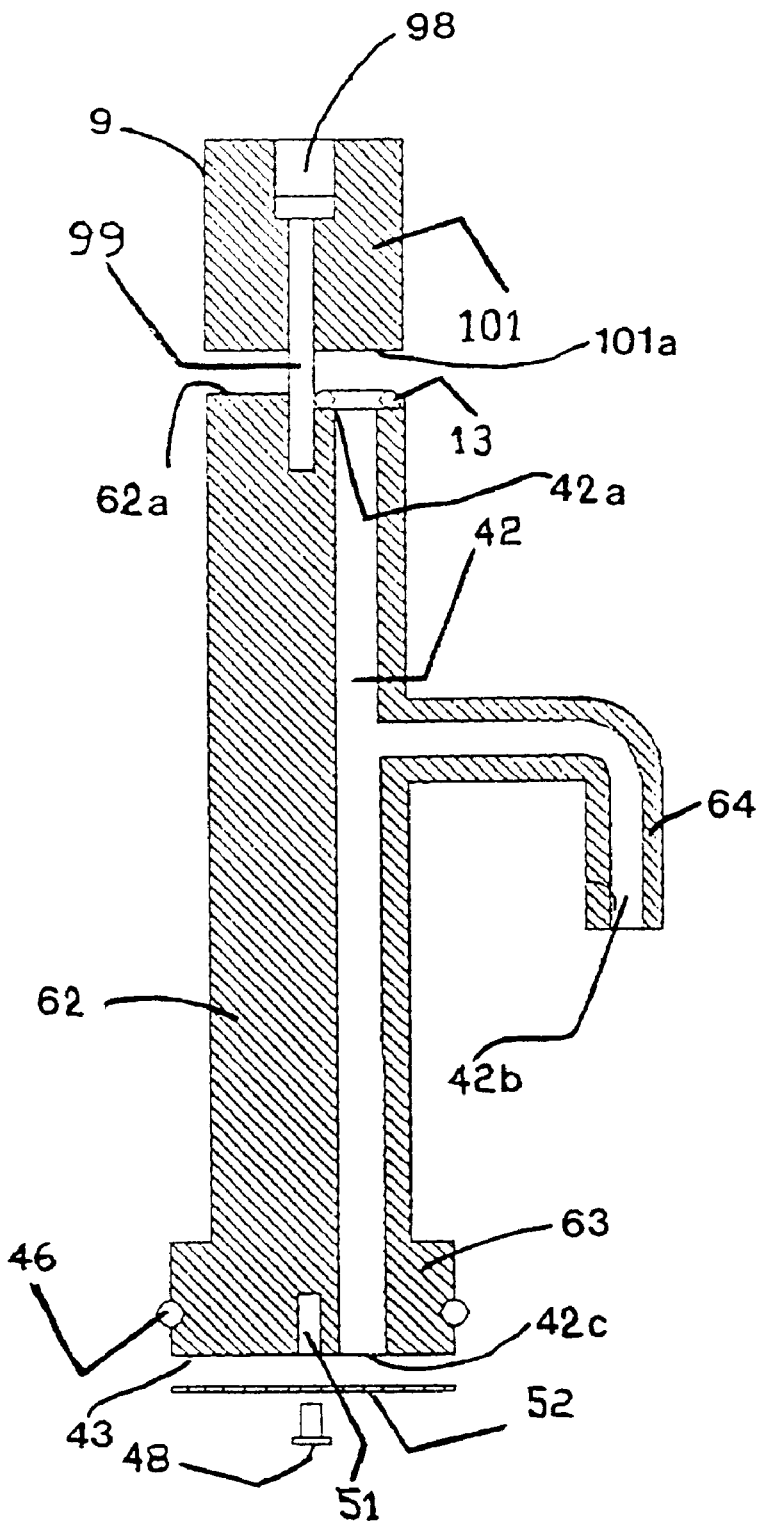
FIG. 3 is a vertical cross-section on a larger scale of a pressure piston of the infusion unit according to the invention.

As shown in FIG. 3, the pressure piston 62 comprises an internal conduit 42 for passage of the infusion, which has at least two openings, a first inlet opening for the infusion 42c opening into the lower surface 43 of the piston, and a second outlet opening 42b forming a small fountain 64 for the outlet of infusion.

According to still another characteristic, the pressure piston has a third opening 42a forming an air intake and arranged in the upper portion 62a of the piston, said pressure piston 62 being moreover movably mounted axially on the pivot 99 and said third opening 42a comprising a joint 13 adapted to close this orifice when the piston comes into contact with the lower portion 101a of the arm 101. The pivot 99 is movably mounted in a hole 98 provided in the arm 101.

The interest in mounting the pressure piston to be axially movable, in combination with the third opening 42a, resides in the provision of an external air intake which, during rising movement of said pressure piston from its compression position to its exhaust position, creates an underpressure in the chamber 31 and hence a sufficiently great intake of atmospheric air into the conduit 42 to drive the coffee grounds resting on the filter plate 36.

So as to impart to the infusion unit according to the invention a steam function, the present invention provides that the body 10 comprises, facing the resistance 26, a secondary boiler 83 which for this purpose has a profiled housing adapted to mate with the sidewall 44 about a peripheral profile 27 by providing a flattened chamber 45 having a cold water inlet 81 and a steam outlet 82.

Thanks to the common use of the resistance 26 and the body 10, this secondary boiler is particularly economical and moreover offers the advantage of instantaneous vaporization of water in this flattened chamber.

Referring to FIG. 1, the invention, according to another characteristic, provides that the filter plate 36 is movably mounted in the infusion chamber 31 by means of an ejection mechanism 16, said mechanism 16 comprising a rod 20 slidably mounted in a bore 20a provided in the body 10 along the longitudinal axis (V) and passing through the cover 37. This embodiment is particularly simple and reliable because particularly the construction of the body 10 permits causing the rod 20 simply to slide in a bore 20a provided below the chamber 31 and along the longitudinal axis V.

Thus, in operation, when the pumping means 40 supply cold water via the inlet 32 of the channels 30, these latter have been heated over all their length practically instantaneously by the electrical resistance 26 and hence provide hot water of constant temperature in the chamber 31. This circulation of hot water and then of infusion in the conduit 42 of the pressure piston 62 which compressively closes the chamber 31, promotes maintaining the temperature of the infusion until the outlet opening 42b of the fountain 64. This infusion is brought by the conduit of thermally insulating plastic material to the point of injection into the copper cups disposed in the automatic dispensing machine.

The invention is particularly applicable to machines for the preparation of expresso-type coffee.

What is claimed is:

1. Infusion unit for an automatic dispenser of beverages made from powdered coffee or the like and comprising a body (10) with a longitudinal axis V enclosing an infusion chamber (31) having a bottom (11) and a mouth (15), comprising a filter plate (36) and adapted to receive a pressure piston (62) mounted movably along the axis (V) by means of a drive mechanism (59), pumping means (40) adapted to create a circulation of water and infusion, as well as a boiler (60) adapted to boil the water for the preparation of the infusion in the chamber (31), characterized in that the boiler (60) and the body (10) are formed of a single piece of heat conductive material which contains an electric heating resistance (26), channels (30) for passage and heating of the water whose inlets (33) are connected to a cold water reservoir (R) and whose ends (33') open through the bottom (11) of the infusion chamber (31), and the pressure piston (62) has a conduit (42) for the passage of the infusion opening through an outlet opening (42b), whilst the pumping means (40) are adapted to create an ascending circulation of water in the infusion chamber (31) toward the conduit (42) when the pressure piston (62) closes the chamber (31).

2. Infusion unit according to claim 1, characterized in that the channels (30) extend mostly along axes parallel to the longitudinal axis (V) below the infusion chamber 31.

3. Infusion unit according to claim 2, characterized in that the channels (30) are each formed by a large rectilinear section (41) opening into the chamber (31) and into a well (42), and a small rectilinear section (43) opening into said well (42) and into the inlet (32), said well being closed by a removable cover (37).

4. Infusion unit according to claim 1, characterized in that the electrical heating resistance (26) extends laterally over all the height of the body (10).

5. Infusion unit according to claim 4, characterized in that the body (10) has in its side portion (44) a groove (29) for the insertion of the resistance (26).

6. Infusion unit according to claim 4, characterized in that the groove (29) has a U shape and the resistance (26) is of the shielded type and has a U shaped pin form similar to the shape of the groove.

7. Infusion unit according to claim 1 characterized in that the drive mechanism (19) comprises a hydraulic jack (61) arranged laterally of the piece forming the boiler (60) and the body (10) and whose piston head (35) comprises an upper rod (65) carrying an arm (101) forming a support and whose free end (9) is connected by a pivot (99) to the pressure piston (62).

8. Infusion unit according to claim 1, characterized in that the pressure piston (62) comprises an internal conduit (42) for the passage of the infusion which has at least two openings, a first inlet opening for the infusion (42c) opening through the lower surface (43) of the pressure piston, and a second outlet opening (42b) forming a small fountain (64) as an outlet for the infusion.

9. Infusion unit according to claim 7, characterized in that the pressure piston has a third opening (42a) forming an air intake and arranged in the upper portion (62a) of the pressure piston, said pressure piston (62) being axially movably mounted on the pivot (99) and said third opening (42a) comprising a joint (13) adapted to close this opening when the pressure piston comes into contact with the lower portion (101a) of the arm (101).

10. Infusion unit according to claims 4 to 6, characterized in that the body (10) comprises facing the resistance (26) a secondary boiler (83) which has for this purpose a shaped housing adapted to match the sidewall (44) with a peripheral profile (27) by providing a flattened chamber (45) having a cold water inlet (81) and a steam outlet (82).

11. Infusion unit according to claim 1, characterized in that the piece of heat conductive material forming the body (10) and the boiler (60) being of aluminum, the internal walls of the chamber 31 and the channels 30 are clad with a material inert to water.

12. Infusion unit according to claim 2, characterized in that the filter plate (36) being movably mounted in the infusion chamber (31) by means of an injection mechanism (16), said mechanism (16) comprises a rod (20) mounted slidably in a bore (20a) provided in the body (10) along the axis (V) and passing through the cover (37).

13. Infusion unit according to claim 1 characterized in that the body (10) and the boiler (61) forming a single bloc are made of an extrudable material resistant to heat and to mechanical stresses.

\* \* \* \* \*